(12) United States Patent
Lin

(10) Patent No.: US 7,392,995 B2
(45) Date of Patent: Jul. 1, 2008

(54) DRIVING DEVICE FOR WHEELS

(76) Inventor: Chiu-Hsiung Lin, No. 18, Daming Rd., Fongyuan City, Taichung County 420 (TW)

( * ) Notice: Subject to any disclaimer, the term of this patent is extended or adjusted under 35 U.S.C. 154(b) by 425 days.

(21) Appl. No.: 11/256,227

(22) Filed: Oct. 21, 2005

(65) Prior Publication Data

US 2007/0090617 A1   Apr. 26, 2007

(51) Int. Cl.
*H02K 7/00* (2006.01)

(52) U.S. Cl. ............... 280/47.31; 380/47.23; 380/47.26; 180/65.1; 180/65.5; 180/65.6; 180/65.7

(58) Field of Classification Search ............. 280/47.31, 280/47.23, 47.26; 180/65.1, 65.5, 65.6, 65.7
See application file for complete search history.

(56) References Cited

U.S. PATENT DOCUMENTS 5,913,937 A * 6/1999 Lin .............................. 74/411
6,278,216 B1 * 8/2001 Li ............................... 310/254
6,345,678 B1 * 2/2002 Chang ......................... 180/181
6,492,756 B1 * 12/2002 Maslov et al. .......... 310/156.12

* cited by examiner

*Primary Examiner*—Christopher P. Ellis
*Assistant Examiner*—Cynthia F Collado
(74) *Attorney, Agent, or Firm*—C. G. Mersereau; Nikolai & Mersereau, P.A.

(57) ABSTRACT

A driving device for a wheelbarrow includes a motor assembly which has a shaft and a driving gear is connected to the shaft. The driving gear is engaged with planet gears of a gear set to drive a collar which is connected to a rim with a tire connected to the rim. Therefore, the wheel rotates when the motor assembly is activated. A brake mechanism an adjustment nut which is threadedly connected to a motor frame of the motor assembly such that when the user pulls a brake lever, the adjustment nut is moved to shift a brake lining to brake the wheel.

3 Claims, 3 Drawing Sheets

DRIVING DEVICE FOR WHEELS

FIELD OF THE INVENTION

The present invention relates to a driving device for a wheelbarrow and the driving device is connected with the wheel and includes a brake mechanism.

BACKGROUND OF THE INVENTION

A conventional wheelbarrow for yard work or even for transporting bricks, sands or stones generally includes a bed with two handles on a rear end thereof and a support is connected to an underside of the rear end of the bed. A brace is connected to the underside of the bed and a wheel is connected to the brace. The user holds the handles and pushes the wheelbarrow so that the load in the bed can be moved form one place to another by the wheel. The support can be put on the ground to support the wheelbarrow to stop the wheelbarrow. However, the conventional wheelbarrow requires the user to move it by the user's own force and when the wheelbarrow is moved along an upward path, the user has to push hard to move the wheelbarrow. On the contrary, when the wheelbarrow is moved along a downward path, the user has to control the wheelbarrow not to move too fast or the wheelbarrow cannot be stopped.

The present invention intends to provide a driving device for driving the wheel of the wheelbarrow so that the user needs not push the wheelbarrow hard and can save a lot of energy to focus on other safety issues.

SUMMARY OF THE INVENTION

The present invention relates to a driving device for a wheelbarrow wherein the driving device includes a motor assembly having a shaft and a rotor is mounted onto the shaft. The rotor has a coil connected thereto. The motor assembly further includes a frame embracing the rotor and magnets, electric brushes, commutators, a motor frame with a threaded section, and a cover. A gear set has a collar which has a toothed inner periphery and a board is located within the collar and a plurality of planet gears are rotatably connected to the board and engaged with the toothed inner periphery. A driving gear is connected to the shaft and engaged with the planet gears. A wheel assembly has a tire connected to a rim and the collar is connected to the rim. A brake mechanism has a connection plate which is connected to a side of the motor frame. An adjustment nut has a threaded inner periphery which is threadedly connected to the threaded section on the motor frame. A brake lining is located between the adjustment nut and the connection plate. A fastener is mounted to an outer periphery of the adjustment nut. A link is connected to the motor frame and connected with an end of a spring. The other end of the spring is connected with the fastener which is connected to a brake lever.

The primary object of the present invention is to provide a driving device for driving a wheel of a wheelbarrow.

Another object of the present invention is to provide a driving device for driving a wheel of a wheelbarrow wherein the wheel can be stopped by operating a brake mechanism.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
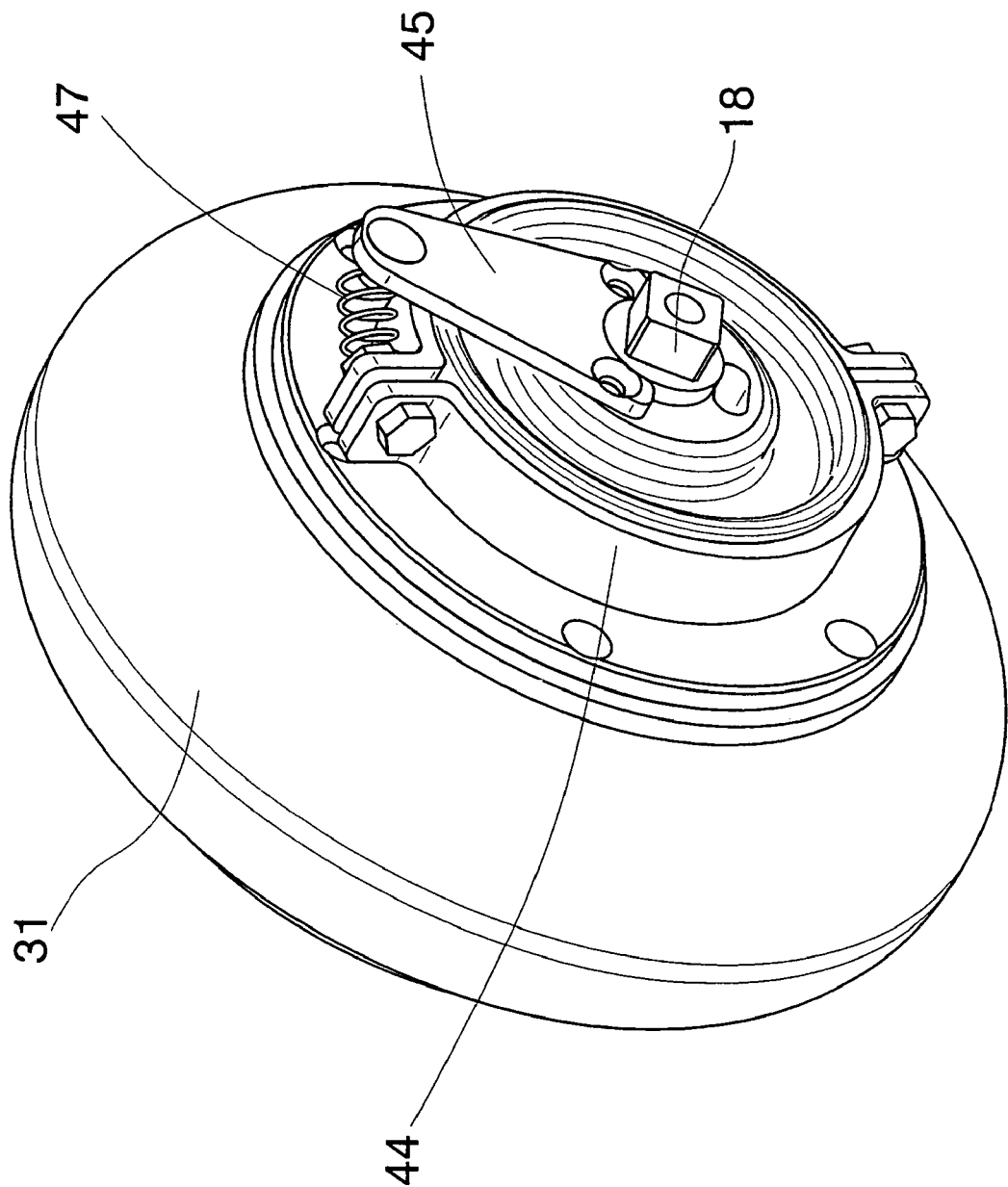
FIG. 1 is a perspective view to show the wheel with the driving device of the present invention.
Figure 2:
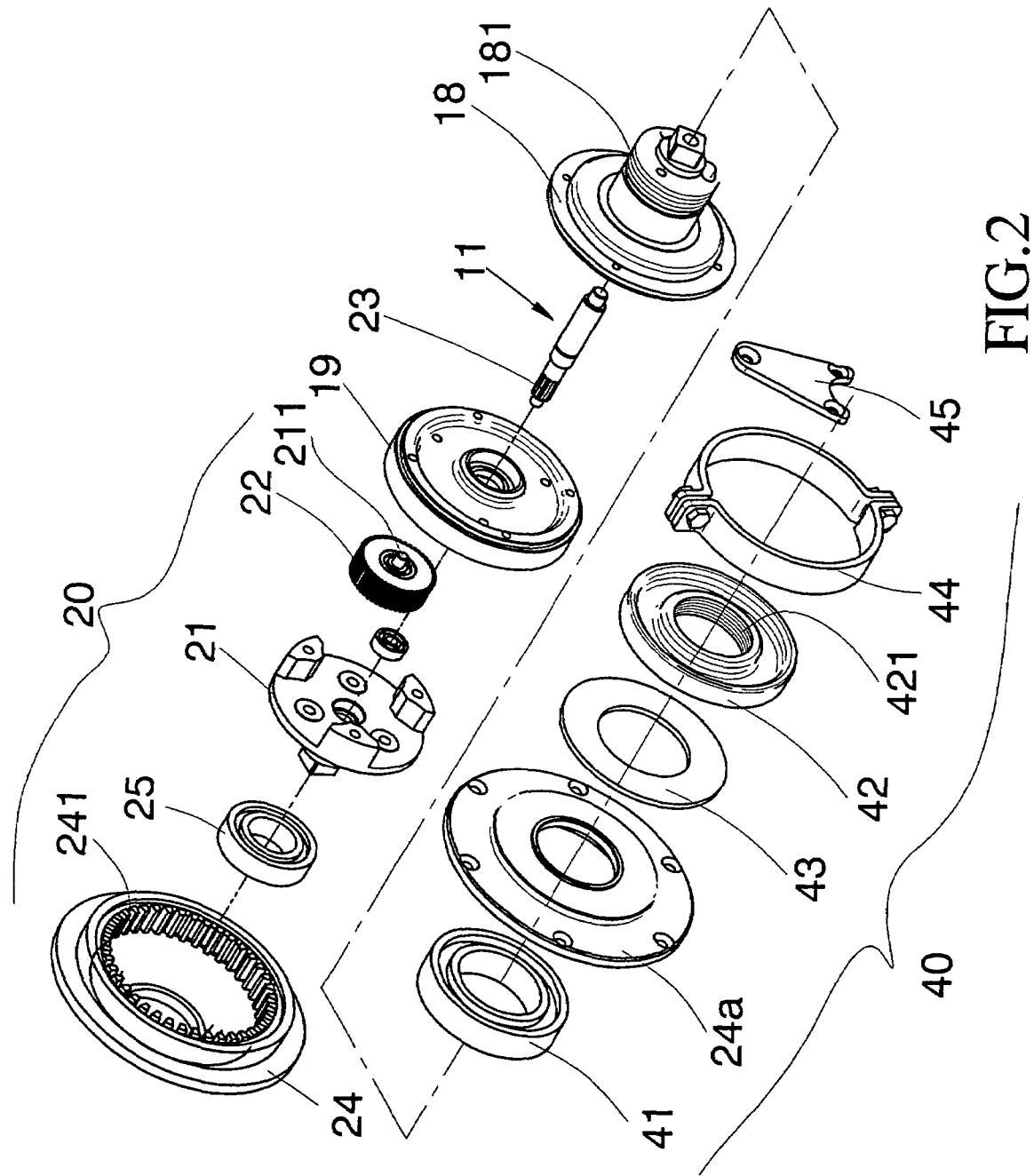
FIG. 2 is an exploded view to show the driving device of the present invention.
Figure 3:
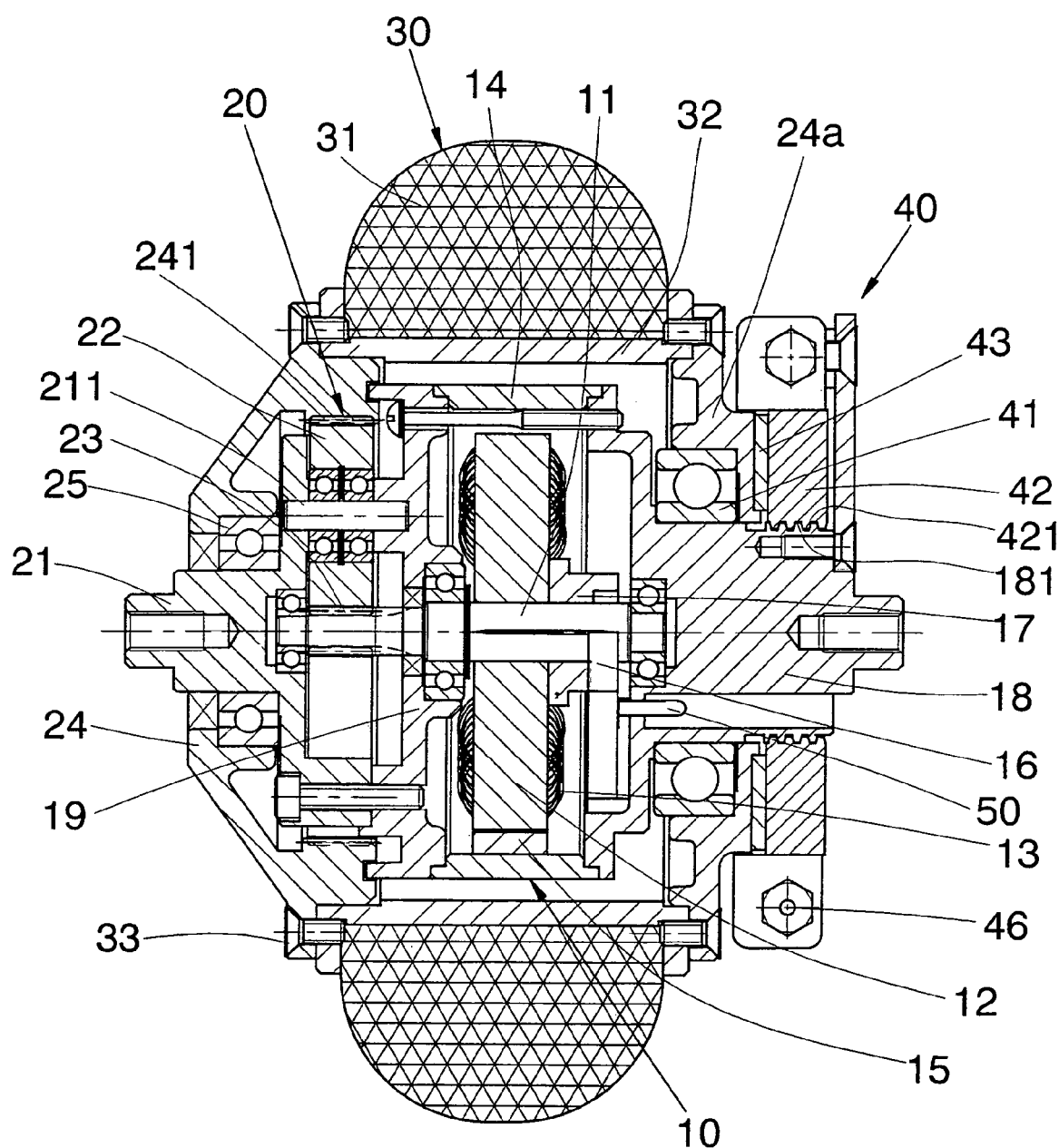
FIG. 3 is a cross sectional view to show the wheel with the driving device of the present invention.

Referring to FIGS. 1 to 3, the driving device of the present invention for driving a wheel of a wheelbarrow comprises a motor assembly 10 which includes a shaft 11 with a rotor 12 mounted onto the shaft 11, the rotor 12 having a coil 13 connected thereto, a frame 14 embracing the rotor 12, magnets 15, electric brushes 16, commutators 17, a motor frame 18 having a threaded section 181, and a cover 19.

A gear set 20 has a collar 24 which has a toothed inner periphery 241 and a board 21 is located within the collar 24. A first bearing 25 is connected between the collar 24 and the board 21. A plurality of planet gears 22 are rotatably connected to the board 21 by pins 211 and engaged with the toothed inner periphery 241. A driving gear 23 is connected to the shaft 11 and located at a center of the planet gears 22 and engaged with the planet gears 22. A wheel assembly 30 has a tire 31 connected to a rim 32 and the collar 24 is connected to the rim 32.

A brake mechanism 40 has a connection plate 24a which is connected to a side of the motor frame 18 and a second bearing 41 is connected between the connection plate 24a and the motor frame 18. An adjustment nut 42 has a threaded inner periphery 421 which is threadedly connected to the threaded section 181 on the motor frame 18. A brake lining 43 is located between the adjustment nut 42 and the connection plate 24a. A fastener 44 is mounted to an outer periphery of the adjustment nut 42. A link 45 is connected to the motor frame 18 and connected with an end of a spring 47. The other end of the spring 47 is connected with the fastener 44 which is connected to a brake lever 46. The threaded section 181 on the motor frame 18 and threaded inner periphery 421 of the adjustment nut 42 have wide pitches so that they can move relative to each other with a small angular movement.

There is a receptacle 50 to be connected with a power cable (not shown) so as to drive the wheel assembly 30 clockwise or counter clockwise. When the shaft 11 of the motor assembly 10 is activated, the planet gears 22 is driven by the driving gear 23 and the collar 24 is rotated and generates a large torque which drives the wheel assembly 30 to move.

When the user wants to stop the wheelbarrow, the power is shot off and the user pulls the brake lever 46, the fastener 44 and the adjustment nut 42 are moved by the threaded inner periphery 421 of the adjustment nut 42 so that the brake lining 43 is moved to contact the connection plate 24a to stop the wheel assembly 30. when releasing the spring 47, the adjustment nut 42 moves back and the brake lining 43 is also removed from the connection plate 24a. The wide pitches of the threaded section 181 on the motor frame 18 and threaded inner periphery 421 of the adjustment nut 42 allow the user to pull the brake lever a small angle to brake the wheel assembly 30.

The wheelbarrow can be easily operated by using the motor assembly 10 and the gear set 20 provides a large torque to easily drive the wheel assembly 30 to move the wheelbarrow on a rugged road. The brake mechanism 40 allows the user to stop the wheelbarrow at desired position.

While we have shown and described the embodiment in accordance with the present invention, it should be clear to those skilled in the art that further embodiments may be made without departing from the scope of the present invention.

What is claimed is:

1. A driving device for a wheelbarrow, comprising:

a motor assembly having a shaft and a rotor mounted onto the shaft, the rotor having a coil connected thereto, a frame embracing the rotor and magnets, electric brushes, commutators, a motor frame having a threaded section, and a cover;

a gear set having a collar which has a toothed inner periphery and a board located within the collar, a plurality of planet gears rotatably connected to the board and engaged with the toothed inner periphery, a driving gear connected to the shaft and engaged with the planet gears;

a wheel assembly having a tire connected to a rim and the collar connected to the rim, and a brake mechanism having a connection plate which is connected to a side of the motor frame, an adjustment nut having a threaded inner periphery which is threadedly connected to the threaded section on the motor frame, a brake lining located between the adjustment nut and the connection plate, a fastener mounted to an outer periphery of the adjustment nut, a link connected to the motor frame and connected with an end of a spring, the other end of the spring connected with the fastener which is connected to a brake lever.

2. The device as claimed in claim 1, wherein a first bearing is connected between the collar and the board, and a second bearing is connected between the connection plate and the motor frame.

3. The device as claimed in claim 1, wherein the threaded section on the motor frame and threaded inner periphery of the adjustment nut have wide pitches.

* * * * *